(12) United States Patent
Thompson

(10) Patent No.: US 7,107,653 B2
(45) Date of Patent: Sep. 19, 2006

(54) CABLE RETENTION DEVICE

(75) Inventor: Alvin Dean Thompson, St. Joseph, MO (US)

(73) Assignee: DT Search & Design, St. Joseph, MO (US)

( * ) Notice: Subject to any disclaimer, the term of this patent is extended or adjusted under 35 U.S.C. 154(b) by 151 days.

(21) Appl. No.: 10/359,867

(22) Filed: Feb. 7, 2003

(65) Prior Publication Data

US 2003/0167602 A1    Sep. 11, 2003

Related U.S. Application Data

(60) Provisional application No. 60/355,430, filed on Feb. 8, 2002.

(51) Int. Cl.
*B65D 63/10* (2006.01)

(52) U.S. Cl. .................. 24/16 PB; 24/271; 24/30.5 P; 24/484; 248/74.3

(58) Field of Classification Search ............. 24/16 PB, 24/22, 20 TT, 593.11, 910, 271, 484, 30.5 P; 248/74.2, 74.3
See application file for complete search history.

(56) References Cited

U.S. PATENT DOCUMENTS

| | | | |
|---|---|---|---|
| 712,765 A | 11/1902 | Cole | |
| 2,881,762 A | 4/1959 | Lowrie | |
| 3,161,210 A | 12/1964 | Loof | |
| 3,925,851 A | 12/1975 | Bevans | |
| 4,183,120 A | 1/1980 | Thorne | |
| 4,305,179 A * | 12/1981 | Sakurada | 24/20 R |
| 4,371,137 A * | 2/1983 | Anscher | 248/73 |
| 4,372,011 A | 2/1983 | Aranyos | |
| 4,502,186 A | 3/1985 | Clarke et al. | |
| 4,557,024 A | 12/1985 | Roberts et al. | |
| 4,881,301 A | 11/1989 | Sweeney et al. | |
| 4,930,192 A * | 6/1990 | Muhr | 24/20 R |
| 4,935,992 A | 6/1990 | Due | |
| 5,216,784 A | 6/1993 | Dyer | |
| 5,354,021 A * | 10/1994 | Farrell | 248/74.3 |
| 5,806,819 A | 9/1998 | Martone | |
| 5,819,376 A * | 10/1998 | Kovalsky et al. | 24/20 TT |
| 5,855,044 A * | 1/1999 | Cradduck | 24/20 R |
| 6,536,719 B1 * | 3/2003 | Rivera | 248/74.3 |

* cited by examiner

*Primary Examiner*—Jack W. Lavinder
(74) *Attorney, Agent, or Firm*—Shughart Thomson & Kilroy, P.C.

(57) ABSTRACT

A tie for bundling a plurality of elongated objects is formed in a generally arcuate configuration from a material having shape retaining memory properties. Complemental teeth on two opposed surface lock the two surfaces together to form a closed loop.

4 Claims, 1 Drawing Sheet

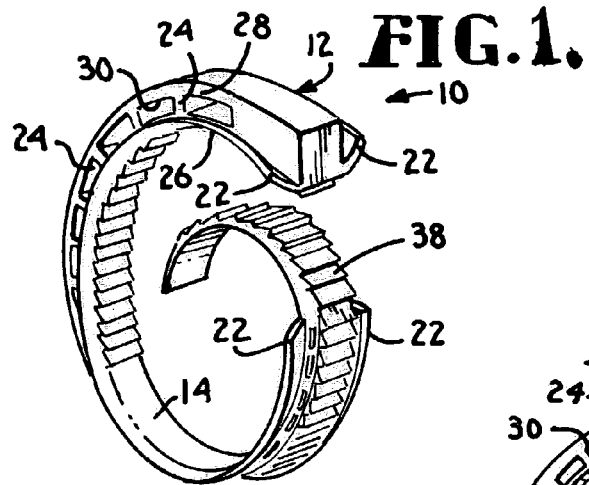
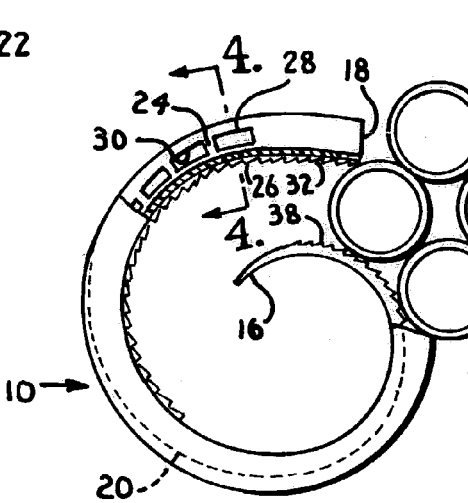
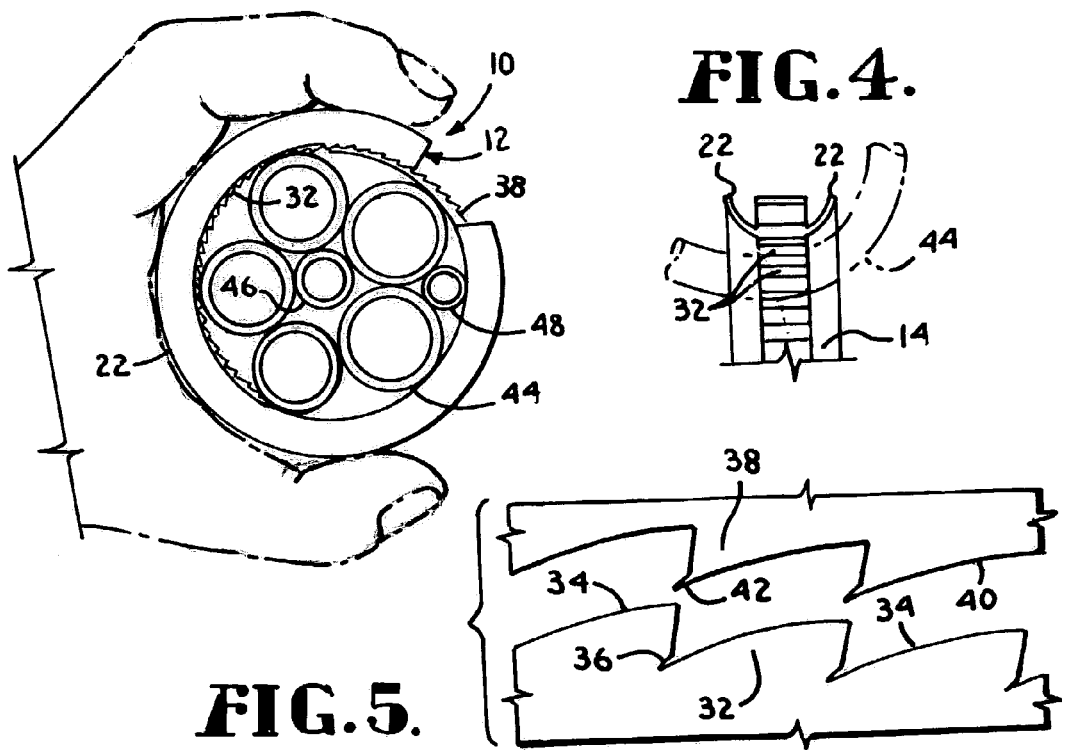

CABLE RETENTION DEVICE

CROSS-REFERENCE TO RELATED APPLICATIONS

This application is based on U.S. Provisional Application Ser. No. 60/355,430, filed on Feb. 8, 2002, which is hereby incorporated herein by reference.

STATEMENT REGARDING FEDERALLY SPONSORED RESEARCH OR DEVELOPMENT

Not Applicable.

BACKGROUND OF THE INVENTION

This invention relates generally to restraining devices and, more particularly to a tie for securing one or more same diameter objects such as cables or wires in a bundle or to another object.

Existing cable ties take several forms. The most elementary example is a wile which is either bare or is coated with insulation and which is twisted around one or more cables which it is desired to bundle together. A more popular cable tie which is now used is a preformed plastic strip which has teeth which pass through a catch box where the teeth engage a complemental restraint which locks the end of the tie in place.

The disadvantages of the prior art devices described above are several. First and foremost, with many types of cable, especially low voltage computer cables, the cable is sensitive to binding and it is frequently the case that the cable tie is tightened too tightly so that it adversely affects the performance of the equipment being fed by the cable. If an uncoated wire is utilized as the tie, significant damage to the cable or cables being secured may result.

Another disadvantage of the prior art, even when utilizing the more popular plastic cable ties described above, is that there is no way to judge when the tie is properly secured and since there is no margin for error, the tie may be too tight and adversely affect performance without the knowledge of the installer who applied the tie.

Another disadvantage of the prior art ties is that for the most part, once they are tightened, they cannot be released except with a cutting tool which destroys the tie.

Another disadvantage of the prior art ties is that even when installed properly so as not to bind the cable during normal use, if the cable is bent around a corner there is the possibility of the cable being pinched and adversely affected even though this was not the case when the cable was laid out in a straight line.

Still another disadvantage of the prior art constructions is that for the most part they require two hands to bring the cable tie around the cable and secure it either to other cables in the bundle or another object.

BRIEF SUMMARY OF THE INVENTION

The present invention overcomes the disadvantages of the prior art by providing a preformed cable tie which has a unique non-binding configuration, which has a partially deformable inner surface and which can be secured with one hand which brings inter-engaging surfaces together. The device also can be secured in varying circumferences but with an outward spring force which is less likely to damage the cable than the "cinching action" of the prior art devices.

In one embodiment, the invention comprises an elongated band having a tail end and a head end. The band is formed in an arcuate configuration from a material having shape retaining memory properties. Because of its shape retaining memory properties, the band may be deformed under force and when the force is released it will return to its approximate original shape. There are a plurality of first locking elements which extend around the surface of the band and a plurality of second locking elements which complementally engage the first locking elements and extend around the outer surface of the band. This combination provides a band which may be compressed with one hand to form an opening to receive a plurality of cables and when the band is released the locking elements engage to retain the cables within the band.

The invention also encompasses a method of holding a plurality of small diameter elongated objects in bundled configuration which comprises providing an elongated band formed in a generally arcuate configuration from a material having shape retaining properties. The band is constructed so that when it is deformed under force and released it will return to its approximate original shape. The method further comprises deforming the band with one hand to provide an opening for insertion of a bundle of elongated objects within the band, placing the bundle of elongated objects within the band, and then releasing the band to allow it to return to its approximate original shape. Finally, the method of the invention includes securing the two ends of the band together to hold the band in the referenced shape.

It is therefore an object of the present invention to provide a cable tie which is less likely to bind the cable or cables being secured as a result of both a unique locking mechanism and a surface construction which will be somewhat yielding to the pressure of the cable against it.

Another objective of this invention is to provide a cable tie which can be operated by one hand to bring one or more cables into a bundled configuration.

As a corollary to the foregoing object, one of the aims of this invention is to provide a cable tie which has spring memory so that it will move in the direction of an engaged locking position once the cables to be retained are inside of it, but we will yield to the cable to present an opening as the cable is being inserted.

An important aim of this invention is to provide a cable tie which provides a margin of error against being tightened too tight, the margin of error being in the form of an inner surface which is somewhat yielding and therefore avoids binding the cable even if tightened beyond what is necessary.

Another aim of this invention is to provide a cable tie which, if necessary, can be released by disengaging the locking mechanism without the need to destroy the tie with a cutting tool.

Still another one of the objects of the invention is to provide a cable tie which provides for a "sure lock" in the form of inter-engaging teeth to ensure that the tie will not come undone.

Still another one of the objectives of this invention is to provide a cable tie which provides for positive engagement of the locking mechanism which can be felt by the user of the device so that he or she will know positive engagement has been obtained.

An important aim of the invention is to provide a cable tie which secures a bundle of cables with a positive outwardly directed "spring action" rather than an inwardly directed cinching action.

Additional objects, advantages, and novel features of the invention will be set forth in the description that follows and in part will become apparent to those skilled in the art upon examination of the following, or may be learned by practice of the invention.

BRIEF DESCRIPTION OF THE DRAWINGS

Other aims and objects of the invention will be made clear or become apparent from the following description and claims when read in light of the accompanying drawing wherein:

FIG. 1 is a perspective view of the cable tie according to the present invention;

FIG. 2 is a side elevational view, with portions cut away and shown in cross section as the cable tie as is being moved into position to hold a bundle of cables;

FIG. 3 is a side elevational view of the cable tie according to the present invention being held between the thumb and forefinger of one hand of a user and locked into position using the one hand shown only;

FIG. 4 is a fragmentary cross-sectional view of the cable tie illustrating the manner in which a cable may be bent around it without damage to the cable; and FIG. 5 is a greatly enlarged exploded side elevational view of the interengagable teeth and body portions of the cable tie.

DETAILED DESCRIPTION OF PREFERRED EMBODIMENT

Referring initially to FIG. 1, the cable tie according to the present invention is designated generally by the numeral 10. Cable tie 10 comprises an annular support 12 of generally rectangular cross section and a generally convex inner face 14 which is integrally formed with annular support 12 around its circumference. The cross sectional area of the support 12 decreases significantly from one end to the other. It is desirable that the cross sectional area of the terminal end designated by the numeral 16 in FIG. 2 be 20 to 25 percent of the area of the opposite terminal end 18 (see FIG. 2). The gradually decreasing dimension of annular support 12 is indicated by broken line 20 in FIG. 2. It is also to be noted that portions of convex inner face 14 are formed by wings 22 which are integral with and project outwardly from support 12.

The construction of annular support 12 is further defined by a honeycomb structure comprising a plurality of spaced apart cross members 24 and a relatively flat planar section 26 (FIG. 1) which is parallel to a second planar section 28 which presents the outer surface of support 12. The two planar sections 26 and 28 are spaced apart to provide an open area 30 that completes the "honeycomb" effect. Of course other cushioning structure could be employed between the planar sections 26 and 28 so that the section 26 will yield under force. It is to be understood that a first annular portion of support 12, extending over an area of approximately 180 degrees, is relatively rigid and inflexible. A second annular portion of support 12, extending over approximately 180 degrees is relatively flexible and is formed so that it has a degree of built in memory which will cause it to be biased outwardly in the general direction of the first annular portion while still being yieldable to allow an object such as one or more cables to move past it. This characteristic of the second annular portion of support 12 will be a function of the particular resinous elastomeric material utilized and the cross sectional area of the second annular portion in comparison to the first annular portion. These parameters are well within the scope of knowledge of one skilled in the art.

Disposed on the inner surface of convex inner face 14 are a plurality of teeth 32 the configuration of which is best shown in FIG. 5. Each tooth 32 comprises a curvilinear surface 34 which terminates in a groove 36.

Complemental teeth 38 are formed along the outer surface of the second annular portion of support 12 as it approaches terminal end 16. Teeth 38 are presented by curvilinear surface 40 which mates with surface 34 and projection 42 which mates with groove 36.

A plurality of cables 44, 46 and 48 are shown in FIG. 2. Cable tie 10 may be moved into position to bundle the cables by holding it between the thumb and forefinger as shown in FIG. 3. This compresses the support 10 and provides an opening for insertion of the cables. The cables are moved to the interior of the band in the manner shown in FIG. 2. There is sufficient flexibility of the second annular portion of support 12 so that it will yield relative to the force of the cables being pushed against it. To this end, the relatively rigid nature of the first annular portion of support 12 facilitates movement of the cables 44–48 inside of the annulus formed by the support. Once the cable bundle is inside of the annulus as shown in FIG. 3, the ends 16 and 18 of tie 10 are moved toward each other so as to bring teeth 32 and 38 into complemental engagement. Once the user senses a reasonable amount of firm resistance to further movement of the ends of the tie, he or she may push with greater force to bring protrusions 42 into engagement with grooves 36 effecting the locking feature of the tie. Projections 42 are designed to snap in place with sufficient force so that the user can sense the engagement and know that locking has been achieved. The outward spring bias of the second half of support 12 helps to achieve positive locking action in a manner that minimizes any binding and without applying a tightening force to the cables beyond that needed to insert them into the device 10 and hold them in a bundled configuration. It is to be understood that various other locking means could be used instead of teeth 32–38 such as flexible pins, slots and grooves, and the like. One advantage of the invention is that teeth 32 and 38 releasably engage so that the cable tie and be removed from the bundled cables without destroying it. This is a direct result of the use of the complemental teeth to achieve the locking action. The term "cable" as used herein encompasses any small diameter elongated objects such as wires, filaments and tubes.

It will be appreciated that the honeycomb construction of annular support 12 provides a degree of resiliency and flexibility to inner face 14 to provide further insurance against the cables being pinched and damaged even if the degree of closure of tie 10 is excessive.

Referring to FIG. 4, a cable 44 is shown bent at nearly a 90 degree angle relative to tie 10. Convex surface 14 accommodates this angular orientation without binding the cable.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

I claim:

1. A tie device for securing about first and second elongated members and comprising:
   (a) an elongated band formed in an annular configuration of a flexible material with a shape retaining property and having a convex inner surface and an outer surface;
   (b) said band having a head end and an opposite tail end;
   (c) said head end being relatively rigid and said tail end being relatively more flexible than said head end to enable radially inward yielding of said tail end to receive said elongated members therein to thereby position said convex inner surface of said band in surrounding relation thereto by a one-handed operation;
   (d) a plurality of inner teeth formed along a portion of said inner surface at said head end and a plurality of outer teeth formed along a portion of said outer surface at said tail end;
   (e) said inner teeth and said outer teeth being configured to releasably and mutually engage in a circumferential direction, with said head end overlapping said tail end and said convex inner surface engaging said elongated members, to enable securing said band about said elongated members with a selected degree of tightening;
   (f) said band including opposite sides; and
   (g) arcuate wings extending from said opposite sides along at least a portion of said band.

2. A tie device as set forth in claim 1 and including:
   (a) a cushioning structure along at least a selected portion of said band.

3. A tie device as set forth in claim 2 wherein said cushioning structure includes:
   (a) a plurality of circumferentially spaced transverse openings formed through said selected portion of said band.

4. A tie device as set forth in claim 1 wherein:
   (a) said band has a first thickness proximate said head end and a lesser second thickness proximate said tail end; and
   (b) said band generally tapers in thickness from said head end to said tail end.

* * * * *